(12) United States Patent
Park et al.

(10) Patent No.: US 9,904,134 B2
(45) Date of Patent: Feb. 27, 2018

(54) LIQUID CRYSTAL DISPLAY DEVICE

(71) Applicant: LG Display Co., Ltd., Seoul (KR)

(72) Inventors: Dong-Woo Park, Gyeongsangbuk-do (KR); Du-Hyun Na, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/388,020

(22) Filed: Dec. 22, 2016

(65) Prior Publication Data

US 2017/0184935 A1 Jun. 29, 2017

(30) Foreign Application Priority Data

Dec. 29, 2015 (KR) .................. 10-2015-0188172

(51) Int. Cl.
*G02F 1/1362* (2006.01)
*G02F 1/1343* (2006.01)
*G02F 1/1333* (2006.01)

(52) U.S. Cl.
CPC .. *G02F 1/136286* (2013.01); *G02F 1/133345* (2013.01); *G02F 1/134309* (2013.01); *G02F 1/136227* (2013.01); *G02F 2201/121* (2013.01)

(58) Field of Classification Search
CPC ....... H01L 29/786; H01L 27/12; H01L 29/78; G02G 1/1362; G02G 1/1333; G02G 1/1334; G02G 1/1335
USPC ........................................... 257/72
See application file for complete search history.

(56) References Cited

U.S. PATENT DOCUMENTS

2005/0208711 A1* 9/2005 Park ................. G02F 1/13458
  438/151
2011/0007234 A1* 1/2011 Liu .................... H01L 27/1214
  349/43

* cited by examiner

*Primary Examiner* — Chuong A Luu
(74) *Attorney, Agent, or Firm* — Morgan, Lewis & Bockius LLP (57) ABSTRACT

A liquid crystal display device (LCD) includes gate lines and data lines extending in a first direction and a second direction crossing the first direction, respectively, on a substrate that includes a display region, where a plurality pixel regions are arranged in row lines and column lines, and a non-display region; a common transfer line extending in the second direction in the non-display region; a gate link line traversing the common transfer line and connected to the gate line at a connection region that is located at an inner side of the common transfer line; and a first blocking portion extending from the common transfer line to a space between the connection region and the display region.

8 Claims, 6 Drawing Sheets

LIQUID CRYSTAL DISPLAY DEVICE

CROSS REFERENCE TO RELATED APPLICATIONS

The present application claims the priority benefit of Korean Patent Application No. 10-2015-0188172 filed in Republic of Korea on Dec. 29, 2015, which is hereby incorporated by reference in its entirety for all purposes as if fully set forth herein.

BACKGROUND

Field of the Invention

The present invention relates to a liquid crystal display device, and more particularly, to a liquid crystal display device which can prevent an electric field from flowing into a display region from a connection region between a gate link line and a gate line.

Discussion of the Related Art

Facing information society, display field of displaying electric information signals has been rapidly advanced, and accordingly, various flat display devices have been developed and used. As flat display devices, a liquid crystal display device (LCD), a plasma display panel device (PDP), an organic light emitting diode (OLED) display device and the like are used.

Among the flat display devices, LCDs are widely used because they have advantages of small size, light weight, thin profile, low power consumption, and the like.

Figure 1:
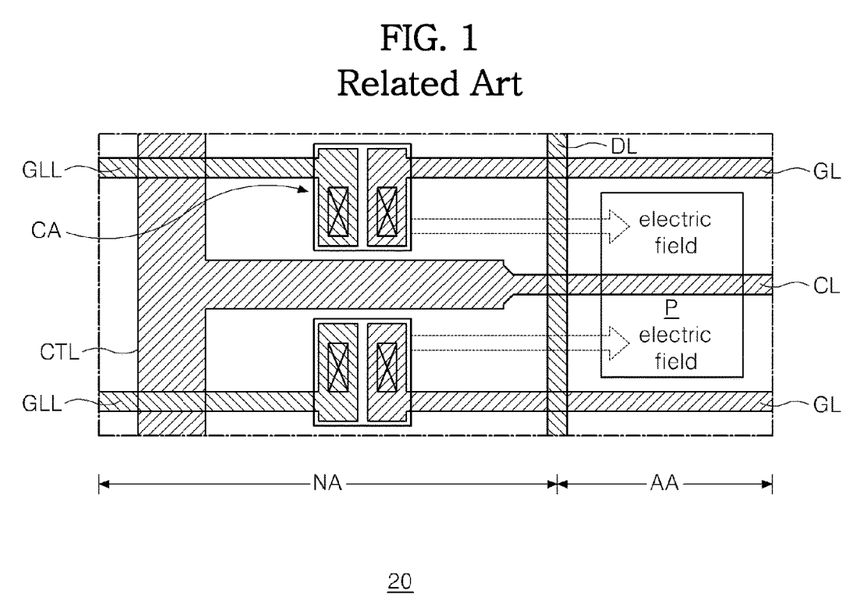
FIG. 1 is a view illustrating a boundary portion between a display region and a non-display region of an array substrate of an LCD according to the related art.

FIG. 1 is a view illustrating a boundary portion between a display region and a non-display region of an array substrate of an LCD according to the related art.

Referring to FIG. 1, pixel regions P defined by gate and data lines GL and DL crossing each other are arranged in a display region AA, and a common transfer line CTL extends in an extension direction of the data line DL in a non-display region NA outside the display region AA.

A gate driving circuit (not shown) outputting gate voltage to the respective gate lines GL is located outside the common transfer line CTL. The gate voltage from the gate driving circuit is transferred to the gate line GL through a gate link line GLL.

The gate link line GLL traverses the common transfer line CTL and is connected to the gate line GL at a connection region CA near the display region AA.

However, since the connection region CA is located near the display region AA, an electric field produced at the connection region CA by the gate voltage flows inside the display region AA. This electric field directly influences the outermost pixels P of the display region AA, and thus arrangement of liquid crystal molecules are abnormally changed.

In this regard, the gate voltage is applied continuously in a DC type, thus a DC electric field flowing from the connection region CA is accumulated and continuously influences the arrangement of the liquid crystal molecules of the outermost pixels P, and thus the liquid crystal molecules of the outermost pixels P are abnormally arranged. Thus, a display quality defect, such as an outermost column line being seen relatively brighter, happens.

SUMMARY

Accordingly, the present invention is directed to a liquid crystal display device that substantially obviates one or more of the problems due to limitations and disadvantages of the related art.

An object of the present invention is to provide a liquid crystal display device that can prevent an electric field from flowing into a display region from a connection region between a gate link line and a gate line.

Additional features and advantages of the invention will be set forth in the description that follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device (LCD) comprises gate lines and data lines extending in a first direction and a second direction crossing the first direction, respectively, on a substrate that includes a display region, where a plurality pixel regions are arranged in row lines and column lines, and a non-display region; a common transfer line extending in the second direction in the non-display region; a gate link line traversing the common transfer line and connected to the gate line at a connection region that is located at an inner side of the common transfer line; and a first blocking portion extending from the common transfer line to a space between the connection region and the display region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings. The same reference numbers may be used throughout the drawings to refer to the same or like parts.

Figure 2:
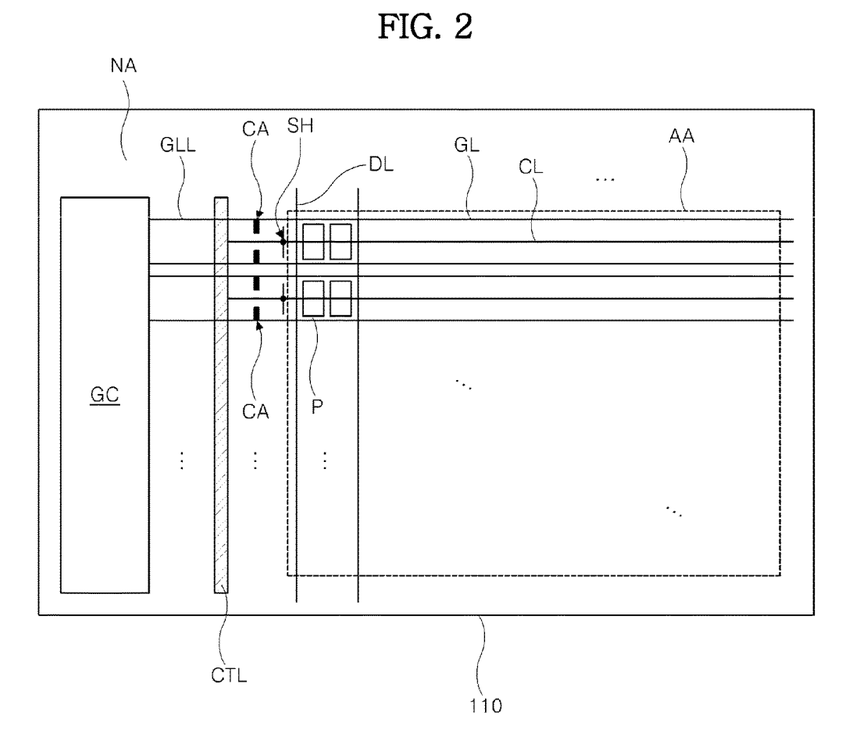
FIG. 2 is a view illustrating an array substrate of an LCD according to a first embodiment of the present invention.

FIG. 2 is a view illustrating an array substrate of an LCD according to a first embodiment of the present invention.

Referring to FIG. 2, the array substrate 110 of this embodiment includes a display region AA and a non-display region NA surrounding the display region AA.

The array substrate 110 includes a plurality of gate line GL extending in a first direction and traversing the display region AA, and a plurality of data lines DL extending in a second direction crossing the first direction and traversing the display region AA.

The gate lines GL and the data lines DL cross each other to defines a plurality of pixel regions P, along row lines and column lines, arranged in a matrix form.

In this embodiment, by way example, it is shown that the pixel regions P are arranged in a DRD (double data rate) structure. In this structure, the pixel regions P on each row line are selectively connected to two gate lines GL located up and down the pixel regions P on each row line, two pixel regions P on each row line are arranged between two neighboring data lines DL, and each pixel region P on each row line is selectively to the data line DL, close thereto or far therefrom, out of the two neighboring data lines DL. Connections of the pixel regions P and the gate and data lines GL and DL in the DRD structure may vary according to an inversion driving method or the like.

It should be understood that this embodiment is applied to an LCD of a structure different from the DRD structure.

In the array substrate 110, a plurality of common lines CL supplied with a common voltage extends in the first direction and traverses the display region AA. Each common line CL is arranged on each row line, and forms a storage capacitor along with a pixel electrode of the pixel region P.

In the non-display region NA of the array substrate 110, a gate driving circuit GC is formed at one end side of the gate line GL i.e., at one side of the display region AA. The gate driving circuit GC may be, example, formed in a GIP (gate-in panel) type or in a COG (chip on glass) type with an IC. In case of the GIP type, the gate driving circuit GC is directly formed in the array substrate 110. In this embodiment, the GIP type gate driving circuit GC is illustrated by way of example.

The gate driving circuit GC outputs gate voltages to the respective gate lines GL.

At an inner side of the gate driving circuit GC i.e., between the gate driving circuit GC and the display region AA, a common transfer line CTL extends in the second direction.

Even though not shown in the drawings, the common transfer line CTL may be formed at a portion of the non-display region NA opposite to the portion of the non-display region NA where the gate driving circuit GC is located with the display region AA between the two opposite portions of the non-display region NA.

The common transfer line CTL is connected to the common line GL so that the common voltage supplied from a power source circuit can be transferred inside the display region AA. The common transfer line CTL and the common line CL may be formed of the same material as and at the same layer as the gate line GL.

The gate driving circuit GC and the gate line GL is connected through a gate link line GLL. The gate link line GLL traverses the common transfer line CTL is connected to the gate line GL near the display region AA.

The gate link line GLL and the common transfer line CTL are located with at least one insulating layer therebetween, and the gate link line GLL may be formed of the same material as and at the same layer as the data line DL.

The gate link line GLL and the gate line GL are connected to each other near a boundary of the display region AA. When an electric field produced at the connection region CA between the gate link line GLL and the gate line GL by the gate voltage flows inside the display region AA, the electric field influences arrangement of liquid crystal molecules of the outermost pixel regions P of the display region AA. To improve this, in this embodiment, a blocking portion SH to block the inflow of the electric field at the connection region CA into the display region AA is configured.

The blocking portion SH is connected to the common transfer line CTL and is supplied with the common voltage, and thus the blocking portion SH can effectively block a DC electric field produced at the connection region CA.

Figure 3:
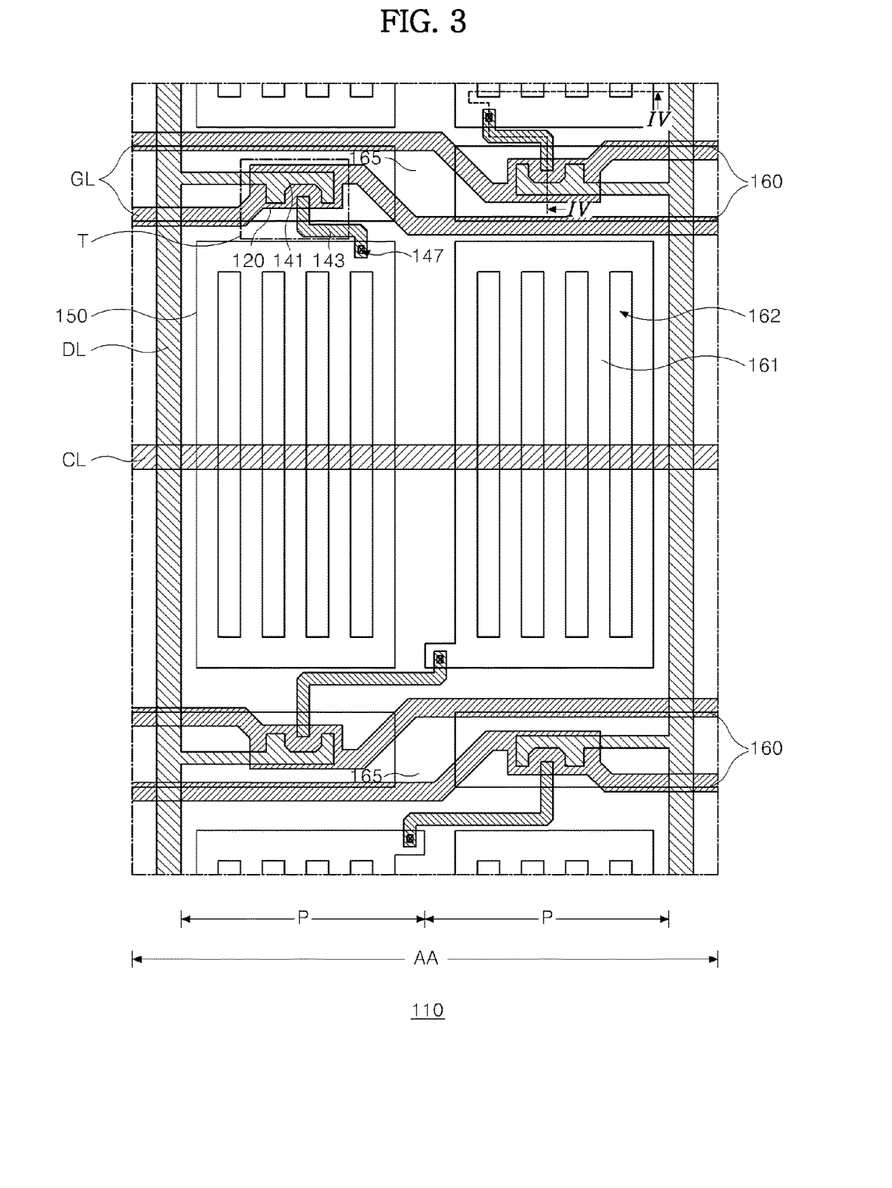
FIG. 3 is a plan view illustrating a part of a display region of an array substrate according to a first embodiment of the present invention.
Figure 5:
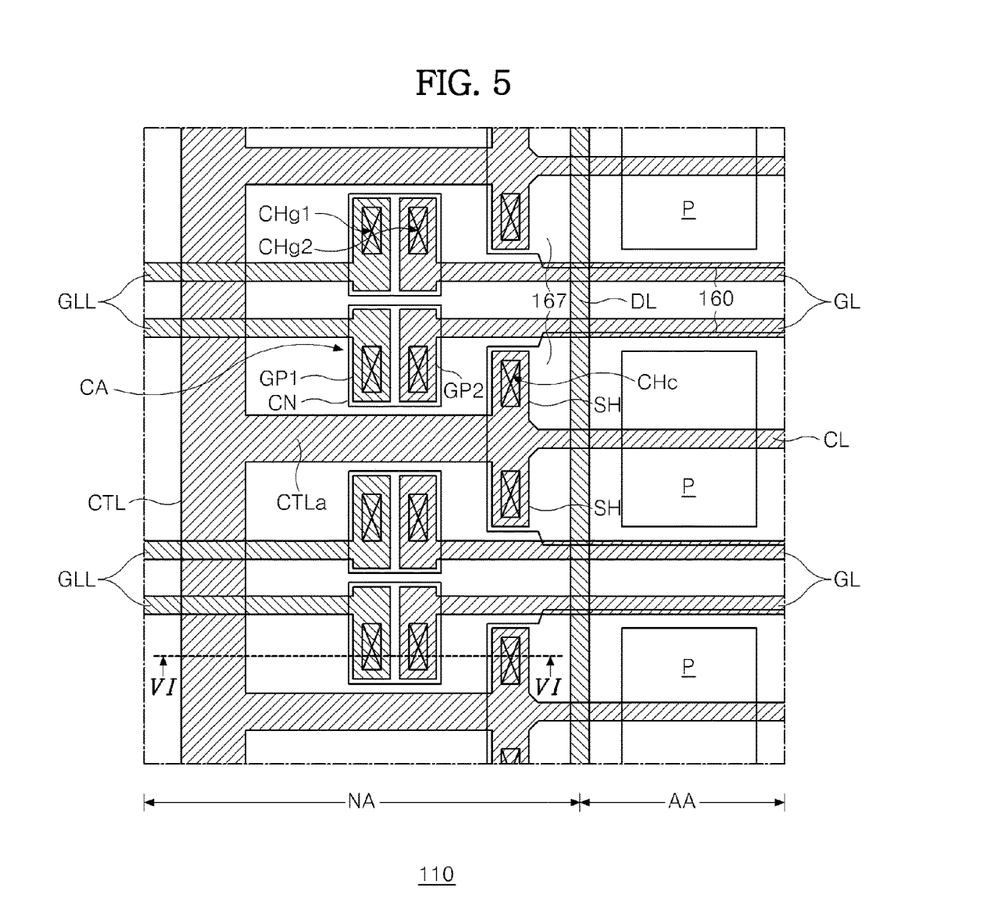
FIG. 5 is a plan view illustrating a boundary portion between a display region and a non-display region of an array substrate according to a first embodiment of the present invention.
Figure 6:
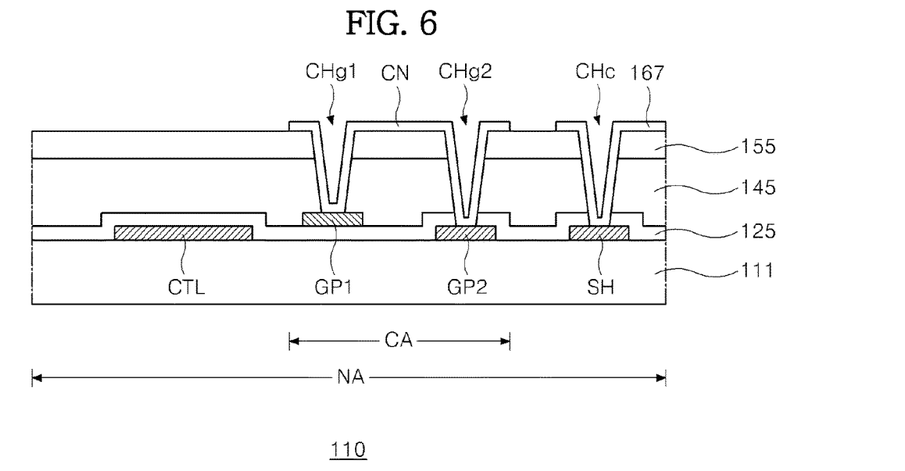
FIG. 6 is a cross-sectional view taken along a line VI-VI of FIG. 5.

A structure of the array substrate 110 including the blocking portion SH is explained further with reference to FIGS. 3 and 6.

Figure 4:
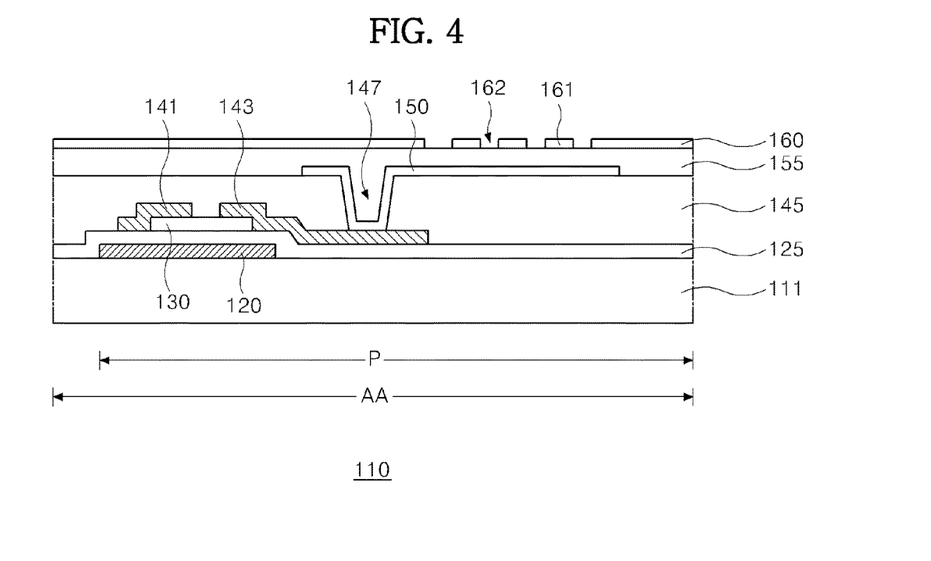
FIG. 4 is a cross-sectional view taken along a line IV-IV of FIG. 3.

FIG. 3 is a plan view illustrating a part of a display region of an array substrate according to a first embodiment of the present invention, and FIG. 4 is a cross-sectional view taken along a line IV-IV of FIG. 3. FIG. 5 is a plan view illustrating a boundary portion between a display region and a non-display region of an array substrate according to a first embodiment of the present invention, and FIG. 6 is a cross-sectional view taken along a line VI-VI of FIG. 5. In FIG. 5, a detail structure of the pixel region P and a detail connection of the pixel region P and the gate and data lines GL and DL are omitted.

The structure of the display region AA is explained in detail further with reference to FIGS. 3 and 4.

In the display region AA of the array substrate 110, a plurality of pixel regions P are arranged. In each pixel region P, a thin film transistor T connected to the corresponding gate and data lines GL and DL and a pixel electrode 150 connected to the thin film transistor T are formed on a substrate 111.

In the display region AA, a common electrode 160 to produce an electric field along with the pixel electrode 150 is formed. The common electrode 160 may be formed to be substantially patterned every row line. Further, the common electrodes 160 on neighboring row lines may be connected to each other partially through a connecting portion 165 therebetween in the display region AA.

The thin film transistor T includes a gate electrode 120 connected to the gate line GL, a semiconductor layer 130 on the gate electrode 120, and source and drain electrodes 141 and 143 spaced apart from each other on the semiconductor layer 130. The source electrode 141 is connected to the data line DL.

A gate insulating layer 125 is formed on the gate line GL and the gate electrode 120. A first passivation layer 145 as an insulating layer is formed on the data line DL and the source and drain electrodes 141 and 143. The first passivation layer 145 has a drain contact hole 147 exposing the drain electrode 143.

The pixel electrode 150 is formed on the first passivation layer 145, and is connected to the drain electrode 143 through the drain contact hole 147. The pixel electrode 150 may be formed to substantially have a plate shape in the pixel region P.

A second passivation layer 155 is formed on the pixel electrode 150. The common electrode 160 is formed on the second passivation layer 155.

The common electrode 160 may have a plurality of electrode patterns 161 that correspond to the pixel electrode 150 (i.e., corresponding to each pixel region P) and each have a bar shape, and an opening 162 is formed between the neighboring electrode patterns 161.

In this configuration, an in-plane electric field referred to as a fringe field is produced between the pixel electrode 150 and the common electrode 160 in each pixel region P to operate liquid crystal molecules.

The above configuration of the pixel electrode 150 and the common electrode 160 is one example, and other configuration may be used. For example, the pixel electrode 150 may have a plurality of bar-shaped electrode patterns, and the common electrode 162 may have a plate shape. Alternatively, each of the pixel electrode 150 and the common electrode 160 may have bar-shaped electrode patterns, and in this case, the pixel electrode 150 and the common electrode 160 may be located at the same layer. Alternatively, the common electrode 160 may be formed in another substrate opposing to the array substrate 110 to produce a vertical electric field along with the pixel electrode 150.

In the display region AA, the common line CL may be formed at the same layer as the gate line GL. The common line CL may extend in the extension direction of the gate line GL and traverse the pixel regions P on each row line. The common line CL forms a storage capacitor along with the pixel electrode 150.

In this embodiment, the LCD having the DRD structure is illustrated by way of example, and an LCD having a structure other than the DRD structure may be used. In the DRD structure, the pixel regions P on each row line may be operated with a group of two neighboring gate lines GL, and two pixel regions P may be located between two neighboring data lines DL. Each pixel region P on the row line may be selectively connected to the data line DL located close to or far from each pixel region P. In this DRD structure, the connection between the pixel regions P and the gate and data lines GL and DL may vary according to an inversion driving method or the like.

The structure of the boundary portion between the display region AA and the non-display region NA is explained in detail further with reference to FIGS. 5 and 6.

The common transfer line CTL extends in the second direction between the gate driving circuit GC and the display region AA. The common transfer line CTL may be formed at the same layer as the gate line GL.

The common transfer line CTL is connected to the common line CL and transfers the common voltage applied from the power source circuit into the display region AA.

The gate link line GLL may be located on the gate insulating layer 125 and be formed at the same layer as the data line DL. The gate link line GLL traverses the common transfer line CTL therebelow and is connected to one end of the gate line GL at the connection region CA near the boundary of the display region AA.

Regarding this connection structure, a first connection pad GP1 is formed at one end of the gate link line GLL, and a second connection pad GP2 is formed at one end of the gate line GL corresponding to the one end of the gate link line GLL.

For stability of the connection, the first connection pad GP1 and the second connection pad GP2 at the connection region CA may have widths greater than those of the gate link line GLL and the gate line GL, respectively. In other words, the first connection pad GP1 and the second connection pad GP2 may have shapes extending, in a width direction of the corresponding lines GLL and GL (i.e., in the second direction), from the corresponding lines GLL and GL.

The first and second connection pads GP1 and GP2 are connected to each other through a jumping pattern i.e., a connection pattern CN. In this regard, the connection pattern CN contacts the first connection pad GP1 through a first pad contact hole CHg1 exposing the first connection pad GP1, and contacts the second connection pad GP2 through a second pad contact hole CHg2 exposing the second connection pad GP2, and thus the first and second connection pads GP1 and GP2 are connected to each other.

The connection pattern CN may be formed in the same process as the common electrode 160, be formed of the same material as and at the same layer as the common electrode 160, and be located on the second passivation layer 155.

The first pad contact hole CHg1 may be formed in the first and second passivation layers 145 and 155, and the second pad contact hole CHg2 may be formed in the first and second passivation layers 145 and 155, and the gate insulating layer 125.

Particularly, in this embodiment, to block the inflow of the electric field at the connection region CA, the blocking portion SH functioning as a blocking electrode extends from the common transfer line CTL between the connection region CA and the boundary of the display region AA.

In this regard, the common transfer line CTL has a lead-in portion CTLa extending toward the display region AA and connected to each common line CL, and the blocking portion SH protrudes from the leak-in portion CTLa in a width direction and extends to a space between the connection region CA and the display region AA.

Since the blocking portion SH is located between the connection region CA and the display region AA, the DC electric field at the connection region CA by the gate voltage flowing into the display region AA can be blocked. Accordingly, an abnormal arrangement of the liquid crystal molecules of the outermost pixel regions P due to the inflow of the DC electric field can be improved.

The blocking portion SH may be configured to be connected to the common electrode 160 on the row line corresponding to the blocking portion SH. To do this, a common contact hole CHc exposing the blocking portion SH may be formed, and the common electrode 160 may be connected to the blocking portion SH through the common contact hole CHc. The common contact hole CHc may be formed in the first and second passivation layers 145 and 155 and the gate insulating layer 125.

A portion i.e., a peripheral portion 167 of the common electrode 160 connected to the blocking portion SH and located in the non-display region NA may have a shape similar to the blocking portion SH. For example, the peripheral portion 167 may cover the blocking portion SH, be located between the connection region CA and the display region AA and extends over the gate line GL. The peripheral portion 167 can function to block the inflow of the DC electric field along with the blocking portion SH.

In this regard, a main factor that produces the electric field from the connection region CA into the display region AA is the second connection pad GP2 of the gate line GL and the connection pattern CN that are located at different layers.

Since the blocking portion SH is located at the same layer as the gate line GL, the blocking portion SH can effectively block the electric field from the gate metal layer. Even though the blocking portion SH can block the electric field from the connection pattern CN at a different layer, the peripheral portion 167 can more efficiently block this electric field from the connection pattern CN at the same layer.

Further, by forming the common contact hole CHc at the blocking portion SH, the electric field blocking effect can be further improved. In other words, since the peripheral portion 167 exists in the common contact hole CHc, the region of the common contact hole CHc functions as a blocking wall for an electric field which substantially has a height from a surface of the substrate 111 to a top surface of the array substrate 110.

Accordingly, the region of the common contact hole CHc functions as a substantially perfect blocking wall in a cross section view, and thus the electric field from the connection region CA can be more effectively blocked.

When the common contact hole CHc is configured to extend in the extension direction of the blocking portion SH, a length of the common contact hole CHc in this extension direction increases thus the electric field blocking effect by the common contact hole CHc can be further improved.

Figure 7:
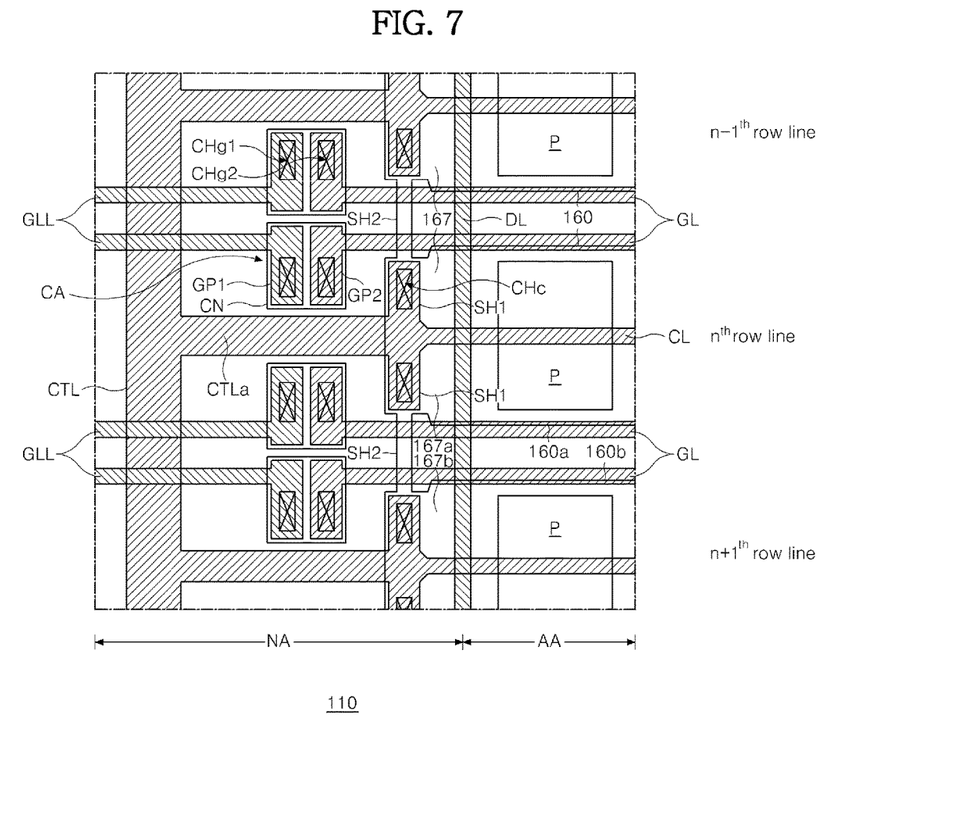
FIG. 7 is a plan view illustrating an array substrate of an LCD according to a second embodiment of the present invention.

FIG. 7 is a plan view illustrating an array substrate of an LCD according to a second embodiment of the present invention. Explanations of parts similar to parts of the first embodiment may be omitted.

Referring to FIG. 7, in the array substrate 110 of the second embodiment, along with the blocking portion SH1 extending from the common transfer line CTL, another blocking portion SH2 connecting the common electrodes 160 at neighboring row lines in the non-display region NA is formed.

For the purpose of explanations, the blocking portion SH1 is referred to as a first blocking portion SH1, and the another blocking portion SH2 is referred to as a second blocking portion SH2. Further, the common electrode 160 located at the $n^{th}$ row line is referred to as a first common electrode 160$a$, and the common electrode 160 located at the $n+1^{th}$ row line is referred to as a second common electrode 160$b$.

The second blocking portion SH2 connects the first common electrode 160$a$ to the second common electrode 160$b$ in the non-display region NA. In other words, the second blocking portion SH2 connects a peripheral portion 167$a$ of the first common electrode 160$a$ to a peripheral portion 167$b$ of the second common electrode 160$b$. As such, the second blocking portion SH2 extends from the first and second common electrodes 160$a$ and 160$b$ in the second direction and connects the first and second common electrodes 160$a$ and 160$b$.

Particularly, the second blocking portion SH2 is located at an inner side of the connection region CA i.e., between the connection region CA and the display region AA. In other words, the second blocking portion SH2 extends in the second direction between the connection region CA and the display region AA.

The second blocking portion SH2 may configured to traverse the gate line located between two neighboring row lines, for example, the $n^{th}$ row line and the $n+1^{th}$ row line. In other words, the second blocking portion SH2 extends in the second direction covering the gate line GL therebelow.

When the second blocking portion SH2 is used along with the first blocking portion SH1, the display region AA is substantially separated from the connection region CA and thus the electric field blocking effect can be maximized.

In other words, in case that the second blocking portion SH2 is not formed, a space between the first and second common electrodes 160$a$ and 160$b$ is communicated with the non-display region NA, and the electric field at the connection region CA flows into the display region AA through the space.

To the contrary, when the second blocking portion SH2 is formed, the space between the first and second common electrodes 160$a$ and 160 is closed by the second blocking portion SH2 at the inner side of the connection region CA thus is spatially separated from the non-display region NA by the second blocking portion SH2.

Accordingly, the inflow of the electric field from the connection region CA into the space between the first and second common electrodes 160$a$ and 160$b$ can be blocked.

Particularly, since the first blocking portion SH1, the peripheral portion 167 of the common electrodes 160 connected to the first blocking portion SH1, and the second blocking portion SH2 extending from the peripheral portion 167 are configured to run without disconnection in the second direction along the boundary of the display region AA, the display region AA is substantially fully separated from the connection region CA and shielded from the electric field.

Accordingly, when using the electric field blocking configuration of this embodiment, the inflow of the electric field from the connection region CA into the display region AA can be completely blocked.

In this regard, the inventors have conducted experiments as to the electric field blocking, and have seen that the electric field blocking effect is almost 100% when using the electric field blocking configuration of this embodiment.

Further, it is seen that the electric field blocking effect is about 80% when using the electric field blocking configuration of the first embodiment. This electric field blocking effect of about 80% does not influence the arrangement of the liquid crystal molecules of the outermost pixel regions, and does not cause the display quality defect due to the inflow of the electric field.

As described above, according to the embodiments, the blocking portion applied with the common voltage is formed between the display region and the connection region of the gate line and the gate link line.

Accordingly, the inflow of the electric field from the connection region into the display region is blocked by the blocking portion. Thus, the abnormal arrangement of the liquid crystal molecules of the outermost pixel regions of the display region due to the inflow of the electric field can be improved, and thus the display quality defect due to the abnormal arrangement of the liquid crystal molecules can be improved.

Further, by preventing the inflow of the electric field into the display region by the blocking portion, a narrow bezel of the LCD can be achieved. In this regard, as one solution to prevent the inflow of the electric field into the display region, arranging dummy pixel regions outside the outermost pixel regions might be considered. However, in this case, a width of a non-display region increases by a width of the dummy pixel regions, and thus a narrow bezel of the LCD cannot be achieved. To the contrary, in the embodiments, by using the blocking portion without any dummy pixel regions, the narrow bezel can be effectively achieved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display device (LCD), comprising:
gate lines and data lines extending in a first axis and a second axis crossing the first axis, respectively, on a substrate that includes a display region including a plurality of pixel regions arranged in row lines and column lines, and a non-display region surrounding the display region, the gate lines and the data lines traversing the display region;
a common transfer line extending in the second axis in the non-display region;
a gate link line traversing the common transfer line and connected to a gate line, among the gate lines, at a connection region that is located at an inner side of the common transfer line and that is in the non-display region; and
a first blocking portion extending, along the second axis, from the common transfer line to a space, in the non-display region, between the connection region and the display region.

2. The LCD of claim 1, further comprising: a common electrode arranged on each row line and connected to the first blocking portion; and a second blocking portion extending between the connection region and the display region and connecting the common electrodes on the neighboring row lines.

3. The LCD of claim 1, further comprising:
an insulating layer having a common contact hole exposing the first blocking portion; and
a common electrode on the insulating layer and connected to the first blocking portion through the common contact hole.

4. The LCD of claim 3, wherein the common contact hole extends in an extension direction of the first blocking portion.

5. The LCD of claim 1, further comprising:
a lead-in portion extending from the common transfer line and connected to a common line traversing the pixel region,
wherein the first blocking portion extends from the lead-in portion.

6. The LCD of claim 1, further comprising:
a first connection pad at one end of the gate link line;
a second connection pad at one end of the gate line that is connected to the gate link line; and
a connection pattern contacting the first and second connection pads through first and second contact holes, respectively,
wherein the gate link line and the data line are located at the same layer, and
wherein the gate line and the common transfer line are located at the same layer.

7. The LCD of claim 2, wherein the second blocking portion extends along the second axis and is in the non-display region.

8. The LCD of claim 5, wherein the lead-in portion extends along the first axis and is in the non-display region.

* * * * *